US011632234B2

(12) United States Patent
Moon et al.

(10) Patent No.: US 11,632,234 B2
(45) Date of Patent: *Apr. 18, 2023

(54) APPARATUS AND METHOD FOR GENERATING CRYPTOGRAPHIC ALGORITHM, APPARATUS AND METHOD FOR ENCRYPTION

(71) Applicants: SAMSUNG SDS CO., LTD., Seoul (KR); Korea Advanced Institute of Science and Technology, Daejeon (KR)

(72) Inventors: Duk-Jae Moon, Seoul (KR); Kyu-Young Choi, Seoul (KR); Joo-Young Lee, Seoul (KR)

(73) Assignees: SAMSUNG SDS CO., LTD., Seoul (KR); Korea Advanced Institute of Science and Technology, Daejeon (KR)

( * ) Notice: Subject to any disclaimer, the term of this patent is extended or adjusted under 35 U.S.C. 154(b) by 141 days.

This patent is subject to a terminal disclaimer.

(21) Appl. No.: 16/664,116

(22) Filed: Oct. 25, 2019

(65) Prior Publication Data

US 2020/0136801 A1 Apr. 30, 2020

(30) Foreign Application Priority Data

Oct. 26, 2018 (KR) .......................... 10-2018-0129223

(51) Int. Cl.
*H04L 9/06* (2006.01)
*H04L 9/08* (2006.01)

(52) U.S. Cl.
CPC .......... *H04L 9/0625* (2013.01); *H04L 9/0631* (2013.01); *H04L 9/0869* (2013.01)

(58) Field of Classification Search
CPC ... H04L 9/0625; H04L 9/0618; H04L 9/0631; H04L 2209/20; H04L 2209/24
See application file for complete search history.

(56) References Cited

U.S. PATENT DOCUMENTS

2001/0019610 A1\* 9/2001 Shimoyama .......... H04L 9/0625
380/29
2011/0096923 A1\* 4/2011 Rollgen ................ H04L 9/0662
380/28

(Continued)

FOREIGN PATENT DOCUMENTS

KR 10-2012-0089396 A 8/2012
KR 10-1516574 B1 5/2015

OTHER PUBLICATIONS

European Search Report For EP 19205338.7 dated Feb. 25, 2020 from European patent office in a counterpart European patent application.

(Continued)

*Primary Examiner* — Theodore C Parsons
*Assistant Examiner* — Alan Lingqian Kong
(74) *Attorney, Agent, or Firm* — The PL Law Group, PLLC (57) ABSTRACT

A method of generating a cryptographic algorithm includes generating at least one key table on the basis of a seed value; generating, by using a round tweak bit string and an input bit string that is input to one of input branches of a Feistel structure, a first transformation function converting the input bit string into a first random bit string having a length that extends beyond a length of the input bit string, generating a second transformation function converting a second random bit string generated by referencing the one or more key tables into a third random bit string having a length that is the same as the length of the input bit string, and generating a block cryptographic algorithm of a Feistel structure which includes a round function to which the one or more key tables, the first transformation function, and the second transformation function are applied.

16 Claims, 4 Drawing Sheets

(56) References Cited

U.S. PATENT DOCUMENTS

| | | |
|---|---|---|
| 2011/0211691 A1 | 9/2011 | Minematsu |
| 2012/0121083 A1* | 5/2012 | You ................. H04L 9/0631 380/28 |
| 2015/0244518 A1 | 8/2015 | Koo et al. |
| 2017/0126396 A1 | 5/2017 | Moon et al. |
| 2020/0136800 A1* | 4/2020 | Moon ................. H04L 9/0625 |

OTHER PUBLICATIONS

Debrup Chakraborty et al. "HCH: A New Tweakable Enciphering Scheme Using the Hash—Encrypt—Hash Approach" INDOCRYPT 2006, LNCS pp. 287-302, Springer-Verlag Berlin Heidelberg, XP019052004.
Homsirikamol Ekawat et al. "AEZ: Anything-But EaZy in Hardware" INDOCRYPT 2016, LNCS 10095, pp. 207-224, XP047363940.
Mioses Liskov et al. "Tweakable Block Ciphers" Journal of Cryptology, Jul. 2011, pp. 588-613, XP055209492.
Office action dated Dec. 9, 2022 from Korean Patent Office in a counterpart Korean Patent Application No. 10-2018-0129223 (all the cited references are listed in this IDS.) (English translation is also submitted herewith.).

* cited by examiner

FIG. 4

APPARATUS AND METHOD FOR GENERATING CRYPTOGRAPHIC ALGORITHM, APPARATUS AND METHOD FOR ENCRYPTION

CROSS-REFERENCE TO RELATED APPLICATION

This application claims priority to and the benefit of Korean Patent Application No. 10-2018-0129223, filed on Oct. 26, 2018, the disclosure of which is incorporated herein by reference in its entirety.

BACKGROUND

1. Field

The following description relates to cryptography.

2. Description of Related Art

The prior art, for example, Korean Patent Registration No. 10-1516574, uses a tweakable block cipher scheme which is secure in a black box environment as internal logic for form preserving encryption. However, the prior art using the tweakable block cipher as in the prior art patent cannot provide safety in a white-box environment and requires additional logics for extending a tweak value that is additional input information. Also, the prior art has a problem that there are many constraints in modifying and expanding an internal state size and characteristics to fit an application environment on the basis of characteristics of the applied tweakable block cipher scheme.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The disclosed embodiments are intended to provide an apparatus and method for generating a cryptographic algorithm and an apparatus and method for encryption.

In one general aspect, there is provided A method of generating a cryptographic algorithm including generating one or more key tables on the basis of a seed value; generating, by using a round tweak bit string and an input bit string that is input to one of input branches of a Feistel structure, a first transformation function that converts the input bit string into a first random bit string having a length that extends beyond a length of the input bit string; generating a second transformation function that converts a second random bit string generated by referencing the one or more key tables into a third random bit string having a length that is the same as the length of the input bit string; and generating a block cryptographic algorithm of a Feistel structure which includes a round function to which the one or more key tables, the first transformation function, and the second transformation function are applied.

The length of the input bit string and a length of an output bit string for the one or more key tables may be dynamically determined on the basis of a size of an available memory.

The length of the first random bit string may be determined on the basis of a predetermined number of times of referencing a key table and the length of the input bit string for the one or more key tables.

The round function may be configured to convert an input bit string input to one of the input branches into the first random bit string using the first transformation function, convert the first random bit string into the second random bit string by referencing the one or more key tables according to a predetermined number of times of referencing a key table, and convert the second random bit string into the third random bit string using the second transformation function.

The round function may be further configured to divide the first random bit string into d (where d is the number of times of referencing a key table) bit strings each having a length of L bits (where L is a length of an input bit string for the one or more key tables) on the basis of the number of times of referencing a key table, convert the d bit strings, each having a length of L bits, into d bit strings, each having m bits (where m is a length of an output bit string for the one or more key tables), by referencing the one or more key tables as many times as the number of times of referencing a key table, and generate the second random bit string by concatenating the d bit strings, each having a length of m bits.

In another general aspect, there is provided an apparatus for generating a cryptographic algorithm including one or more processors; a memory; and one or more programs, wherein the one or more programs are stored in the memory and are configured to be executed by the one or more processors and the one or more programs include commands for generating one or more key tables on the basis of a seed value, generating, by using a round tweak bit string and an input bit string that is input to one of input branches of a Feistel structure, a first transformation function that converts the input bit string into a first random bit string having a length that extends beyond a length of the input bit string, generating a second transformation function that converts a second random bit string generated by referencing the one or more key tables into a third random bit string having a length that is the same as the length of the input bit string, and generating a block cryptographic algorithm of a Feistel structure which includes a round function to which the one or more key tables, the first transformation function, and the second transformation function are applied.

The length of the input bit string and a length of an output bit string for the one or more key tables may be dynamically determined on the basis of a size of an available memory.

The length of the first random bit string may be determined on the basis of a predetermined number of times of referencing a key table and the length of the input bit string for the one or more key tables.

The round function may be configured to convert an input bit string input to one of the input branches into the first random bit string using the first transformation function, convert the first random bit string into the second random bit string by referencing the one or more key tables according to a predetermined number of times of referencing a key table, and convert the second random bit string into the third random bit string using the second transformation function.

The round function may be further configured to divide the first random bit string into d (where d is the number of times of referencing a key table) bit strings each having a length of L bits (where L is a length of an input bit string for the one or more key tables) on the basis of the number of times of referencing a key table, convert the d bit strings, each having a length of L bits, into d bit strings, each having m bits (where m is a length of an output bit string for the one or more key tables), by referencing the one or more key tables as many times as the number of times of referencing a key table, and generate the second random bit string by concatenating the d bit strings, each having a length of m bits.

In still another general aspect, there is provided a method of encryption including generating a round tweak bit string; converting, by using a first transformation function, the round tweak bit string and a first input bit string, which is input to one of input branches of a Feistel structure, into a first random bit string having a length that extends beyond a length of the first input bit string; converting the first random bit string into a second random bit string by referencing one or more key tables; converting, by using a second transformation function, the second random bit string into a third random bit string having the same length as the length of the first input bit string; and performing an exclusive OR operation between the third random bit string and a second input bit string that is input to another input branch among the input branches of the Feistel structure.

The length of the first random bit string may be determined on the basis of a predetermined number of times of referencing a key table and the length of the input bit string for the one or more key tables.

The converting into the second random bit string may include converting the first random bit string into the second random bit string by referencing the one or more key tables according to a predetermined number of times of referencing a key table.

The converting into the second random bit string may include dividing the first random bit string into d (where d is the number of times of referencing a key table) bit strings each having a length of L bits (where L is a length of an input bit string for the one or more key tables) on the basis of the number of times of referencing a key table, converting the d bit strings, each having a length of L bits, into d bit strings, each having m bits (where m is a length of an output bit string for the one or more key tables), by referencing the one or more key tables as many times as the number of times of referencing a key table, and generating the second random bit string by concatenating the d bit strings, each having a length of m bits.

In yet another general aspect, there is provided an apparatus for encryption including one or more processors; a memory; and one or more programs, wherein the one or more programs are stored in the memory and are configured to be executed by the one or more processors and the one or more programs include commands for generating a round tweak bit string, converting, by using a first transformation function, the round tweak bit string and a first input bit string, which is input to one of input branches of a Feistel structure, into a first random bit string having a length that extends beyond a length of the first input bit string, converting the first random bit string into a second random bit string by referencing one or more key tables, converting, by using a second transformation function, the second random bit string into a third random bit string having the same length as the length of the first input bit string, and performing an exclusive OR operation between the third random bit string and a second input bit string that is input to another input branch among the input branches of the Feistel structure.

The length of the first random bit string may be determined on the basis of a predetermined number of times of referencing a key table and the length of the input bit string for the one or more key tables.

The converting into the second random bit string may include converting the first random bit string into the second random bit string by referencing the one or more key tables according to a predetermined number of times of referencing a key table.

The converting into the second random bit string may include dividing the first random bit string into d (where d is the number of times of referencing a key table) bit strings each having a length of L bits (where L is a length of an input bit string for the one or more key tables) on the basis of the number of times of referencing a key table, converting the d bit strings, each having a length of L bits, into d bit strings, each having m bits (where m is a length of an output bit string for the one or more key tables), by referencing the one or more key tables as many times as the number of times of referencing a key table, and generating the second random bit string by concatenating the d bit strings, each having a length of m bits.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art.

Descriptions of well-known functions and constructions may be omitted for increased clarity and conciseness. Also, terms described in below are selected by considering functions in the embodiment and meanings may vary depending on, for example, a user or operator's intentions or customs. Therefore, definitions of the terms should be made on the basis of the overall context. The terminology used in the detailed description is provided only to describe embodiments of the present disclosure and not for purposes of limitation. Unless the context clearly indicates otherwise, the singular forms include the plural forms. It should be understood that the terms "comprises" or "includes" specify some features, numbers, steps, operations, elements, and/or combinations thereof when used herein, but do not preclude the presence or possibility of one or more other features, numbers, steps, operations, elements, and/or combinations thereof in addition to the description.

Figure 1:
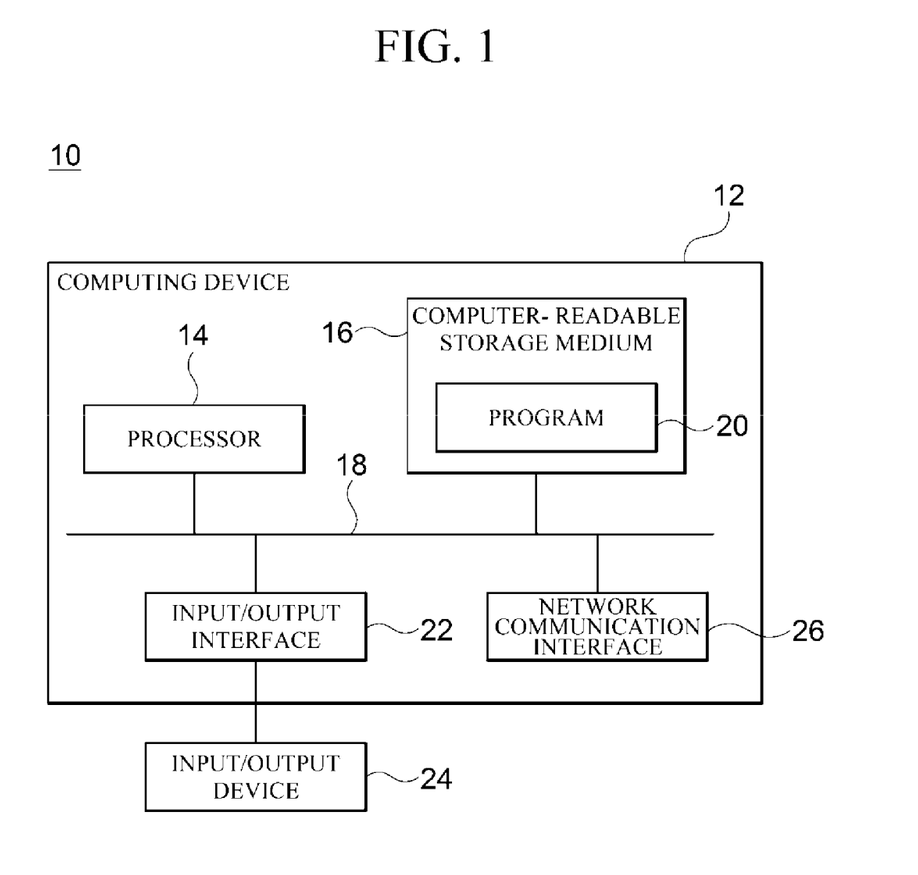
FIG. 1 is a block diagram for describing a computing environment including a computing device suitable to be used in exemplary embodiments.

FIG. 1 is a block diagram for describing a computing environment 10 including a computing device suitable to be used in exemplary embodiments. In the illustrated embodiments, each of the components may have functions and capabilities different from those described hereinafter and additional components may be included in addition to the components described herein.

The illustrated computing environment 10 includes a computing device 12. In one embodiment, the computing device 12 may be an apparatus for performing at least one of a cryptographic algorithm generation method and an encryption method according to embodiments of the present disclosure. The computing device 12 may include at least one processor 14, a computer-readable storage medium 16, and a communication bus 18. The processor 14 may cause the computing device 12 to operate according to the above-described exemplary embodiment. For example, the processor 14 may execute one or more programs stored in the computer-readable storage medium 16. The one or more programs may include one or more computer executable commands, and the computer executable commands may be configured to, when executed by the processor 14, cause the computing device 12 to perform operations according to an exemplary embodiment.

The computer-readable storage medium 16 is configured to store computer executable commands and program codes, program data and/or information in other suitable forms. The program 20 stored in the computer-readable storage medium 16 may include a set of commands executable by the processor 14. In one embodiment, the computer-readable storage medium 16 may be a memory (volatile memory, such as random access memory (RAM), non-volatile memory, or a combination thereof), one or more magnetic disk storage devices, optical disk storage devices, flash memory devices, storage media in other forms capable of being accessed by the computing device 12 and storing desired information, or a combination thereof.

The communication bus 18 connects various other components of the computing device 12 including the processor 14 and the computer-readable storage medium 16.

The computing device 12 may include one or more input/output interfaces 22 for one or more input/output devices 24 and one or more network communication interfaces 26. The input/output interface 22 and the network communication interface 26 are connected to the communication bus 18. The input/output device 24 may be connected to other components of the computing device 12 through the input/output interface 22. The illustrative input/output device 24 may be a pointing device (a mouse, a track pad, or the like), a keyboard, a touch input device (a touch pad, a touch screen, or the like), an input device, such as a voice or sound input device, various types of sensor devices, and/or a photographing device, and/or an output device, such as a display device, a printer, a speaker, and/or a network card. The illustrative input/output device 24, which is one component constituting the computing device 12, may be included inside the computing device 12 or may be configured as a device separate from the computing device 12 and be connected to the computing device 12.

Figure 2:
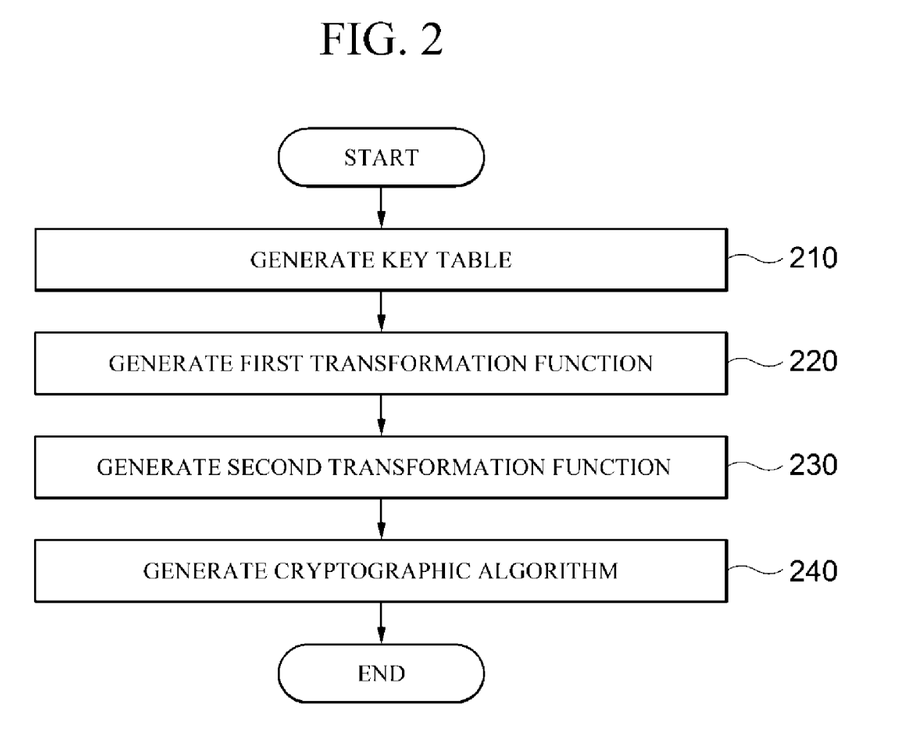
FIG. 2 is a flowchart illustrating a method of generating a cryptographic algorithm according to one embodiment of the present disclosure.

FIG. 2 is a flowchart illustrating a method of generating a cryptographic algorithm according to one embodiment of the present disclosure.

Referring to FIG. 2, a computing device 12 generates one or more key tables on the basis of a seed value (210).

In this case, the seed value may be, for example, an encryption key, a counter value or an initialization vector used in operation mode of block encryption, or the like.

In addition, the key table means a lookup table that includes random bit strings derived from the seed value and index bit strings that correspond to the random bit strings, respectively. Specifically, the key table may be configured to output a bit string having the same index bit string as an input bit string of the key table among the random bit strings included in the key table as an output bit string of the key table.

Meanwhile, for example, the generation of the key table may be performed using a random number generator that generates a random bit string using the seed value as an input value. However, it is not necessary to use a particular method to generate the key table, and various methods having a one-way characteristic whereby a random value is generated from the seed value and the seed value is difficult to be inferred from the generated value may be used in generating the key table.

Meanwhile, according to one embodiment, a size of the key table may be determined by lengths of input bit string and output bit string of the key table. In this case, the lengths of the input bit string and output bit string may be dynamically determined according to a size of an available memory that can be used in an environment to which a cryptographic algorithm is to be applied. For example, in a case where a length of the input bit string of the key table is L bits and the length of the output bit string is m bits, the key table may include $2^L$ index bit strings each having a length of L bits and $2^L$ random bit strings that each have a length of m bits and correspond to the index bit strings, respectively.

Then, the computing device 12 uses a round tweak bit string and an input bit string, which is input to one of input branches of a Feistel structure, to generate a first transformation function which converts an input bit string into a first random bit string having a length that extends beyond a length of the input bit string (220).

In this case, the length of the first random bit string may be determined according to a length of the input bit string of the key table and the predetermined number of times of referencing the key table. For example, when a length of the input bit string of the key table is L bits and the number of times of referencing the key table is set to d, the length of the first random bit string may be L×d bits. Meanwhile, the number of times of referencing the key table may be set by the user in consideration of security strength.

Meanwhile, the first transformation function may be, for example, an advanced encryption standard (AES) algorithm, a hash function, or the like, and any function will do as long as it can generate a random bit string having a length of L×d bits using a round tweak bit string and an input bit string which is input to an input branch.

Then, the computing device 12 generates a second transformation function that converts a second random bit string, which is generated by referencing the one or more generated key tables, into a third random string bit having the same length as the length of the input bit string which is input to the input branch (230).

In this case, when the length of the output bit string of the key table is m bits and the number of times of referencing the key table is d, the length of the second random bit string may be m×d bits.

The second transformation function may be, for example, an AES algorithm, a hash function, or the like, but any function will do as long as it can convert a random bit string input to the second transformation function into a random bit string having the same length as the length of the input bit string which is input to the input branch.

Then, the computing device 12 generates a block cryptographic algorithm of a Feistel structure that includes a round function to which the first transformation function, one or more key tables, and the second transformation function are applied (240).

Specifically, the generated block cryptographic algorithm of a Feistel structure may include r (where r is a natural number greater than or equal to 1) rounds and may be configured to allow a round function to be executed at each round. In this case, the number of rounds may be dynamically determined according to security strength required in an environment to which the generated cryptographic algorithm is to be applied.

Meanwhile, in FIG. 2, the process of generating a cryptographic algorithm is described as being divided into a plurality of operations. However, it should be noted that at least some of the operations may be performed in different order or may be combined into fewer operations or further divided into more operations. In addition, some of the operations may be omitted, or one or more extra operations, which are not illustrated, may be added to the flowchart and be performed.

Figure 3:
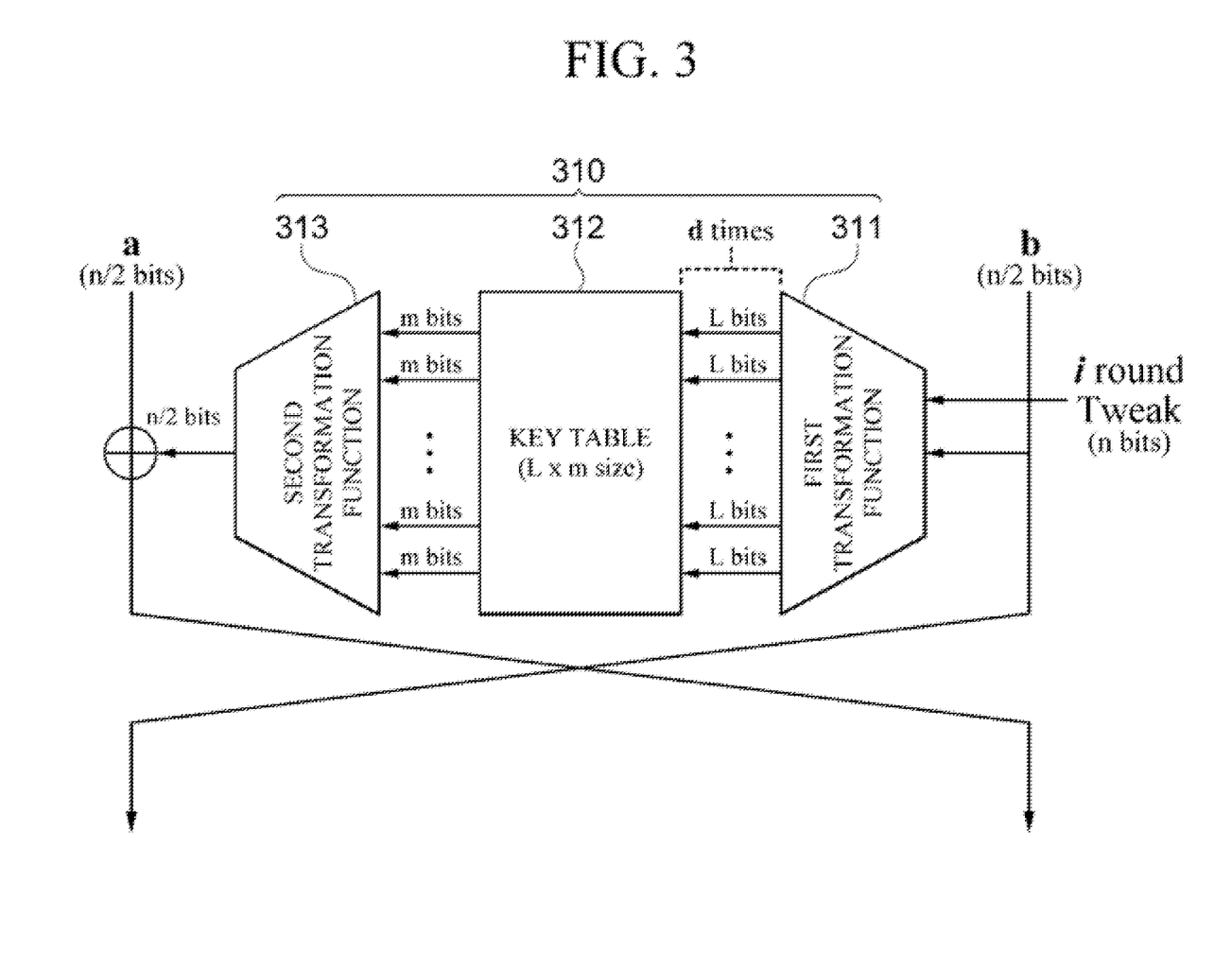
FIG. 3 is a diagram illustrating one example of a round function according to one embodiment of the present disclosure.

FIG. 3 is a diagram illustrating one example of a round function according to one embodiment of the present disclosure.

In FIG. 3, a Feistel structure having two input branches a and b is illustrated, but the number of input branches may vary according to an embodiment.

Referring to FIG. 3, a round function 310 generated according to one embodiment of the present disclosure may be configured such that bit string conversion using a first transformation function 311, bit string conversion using one or more key tables 312, and bit string conversion using a second transformation function 313 are sequentially performed.

Specifically, the first transformation function 311 may receive an input bit string of n/2 (where n≥2), which is input to an input branch b, and a round tweak bit string and generate a first random bit string with a length of L×d bits (where L is a length of an input bit string of the key table and d is the number of times of referencing the key table).

In this case, the length of the input bit string input to the input branch b may vary according to a length n of a unit input required in an environment to which the generated cryptographic algorithm is to be applied. For example, in a case where plaintext is required to be divided into units of 4 bits (i.e., n=4) and be encrypted in an environment to which a generated block cryptographic algorithm is to be applied, the length of input bit string to be input to the input branches a and b may be 2 bits.

The round tweak bit string may be generated using, for example, an initial tweak value as a seed value at each round of a Feistel structure. In this case, a length T of the round tweak bit string may vary depending on, for example, security strength required. Meanwhile, it is not necessary to use a particular method to generate the round tweak bit string, and the round tweak bit string may be generated using various methods that can generate a random bit string with a predetermined length using an initial tweak value as a seed value.

Meanwhile, assuming that AES-128 is used as the first transformation function 311, the first transformation function 311 may pad a predetermined bit string of 128−(n/2) bits to the input bit string input to the input branch b and then generate a random bit string having a length of L×d bits (i.e., 128 bits) by performing an operation according to AES-128. In this case, a secret key used to perform the operation according to AES-128 may be a round tweak bit string.

The first random bit string output from the first transformation function 311 is divided into d bit strings in units of L bits, and the divided bit strings are converted into d bit strings each having a length of m bits (where m is a length of an output bit string of the key table).

In this case, the number of key tables 312 included in the round function 310 may be one or more. For example, when there is one key table 312 as shown in the example, the corresponding key table 312 is repeatedly referenced to convert each of the divided bit strings into a corresponding bit string having a length of m bits. That is, in this case, the same key table 312 is repeatedly referenced d times.

On the other hand, unlike the illustrated example, when the number of key tables included in the round function 310 is two or more, the total number of times of referencing the key tables is d but the number of times of referencing each key table may differ from one key table to another. In this case, determination of a key table to be referenced is not limited to a particular method, and the key table may be set using various methods according to an embodiment.

Meanwhile, the second transformation function 313 concatenates the d bit strings, each having a length of m bits, to generate a second random bit string with a length of m×d bits, and then converts the second random bit string into a third random bit string with a length of n/2 bits.

As a specific example, when it is assumed that SHA-256 is used as the second transformation function 313, the second transformation function 313 may convert the second random bit string into a random bit string of 256 bits by performing an operation according to SHA-256. Thereafter, the second transformation function 313 may select a bit string that correspond to upper n/2 bits from the converted bit string and output the selected bit string as the third random bit string.

Figure 4:
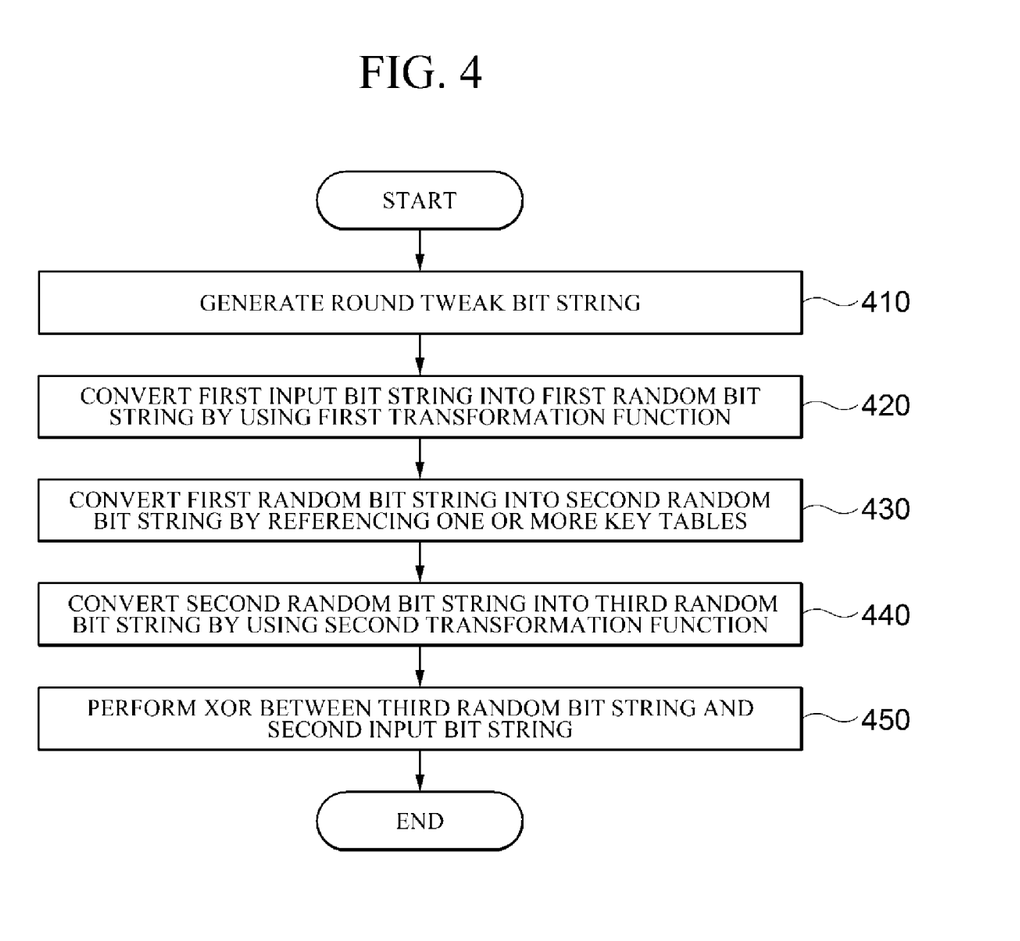
FIG. 4 is a flowchart illustrating a method of encryption according to one embodiment of the present disclosure.

FIG. 4 is a flowchart illustrating a method of encryption according to one embodiment of the present disclosure.

The method of encryption shown in FIG. 4 may be performed using a block cryptographic algorithm generated using the cryptographic algorithm generation method shown in FIG. 2.

Referring to FIG. 4, a computing device 12 generates a round tweak bit string (410).

Then, the computing device 12 uses a first transformation function to convert the round tweak bit string and a first input bit string, which is input to one or input branches of a Feistel structure, into a first random bit string having a length that extends beyond a length of the first input bit string (420).

Specifically, the computing device 12 may use the first transformation function 311 to convert the round tweak bit string and the first input bit string into the first random bit string with a length of L×d bits (where L is a length of the input bit string of a key table and d is the number of times of referencing the key table).

Then, the computing device 12 converts the first random bit string into a second random bit string by referencing one or more key tables (430).

Specifically, in a case where the first random bit string is L×d bits, the computing device 12 may divide the first random bit string into d bit strings, each having a length of L bits. In addition, the computing device 12 may convert the d bit strings into d bit strings that each have a length of m bits (where m is a length of an output bit string of the key table) and correspond to the divided bit strings, respectively, by referencing the key tables, and then generate a second random bit string having a length of m×d bits by concatenating the d converted bit strings, each having a length of m bits.

Thereafter, the computing device 12 uses a second transformation function to convert the second random bit string into a third random bit string that has the same length as the length of the first input bit string (440).

Then, the computing device 12 performs an exclusive OR operation between the third random bit string and a second input bit string that is input to another input branch of the input branches of the Feistel structure (450).

Meanwhile, in FIG. 4, the encryption process is described as being divided into a plurality of operations. However, it should be noted that at least some of the operations may be performed in different order or may be combined into fewer operations or further divided into more operations. In addition, some of the operations may be omitted, or one or more extra operations, which are not illustrated, may be added to the flowchart and be performed.

According to the embodiments of the present disclosure, a cryptographic algorithm of a Feistel structure in which a key table that can protect an encryption key within a white-box environment is applied to a round function is generated and encryption is performed using the cryptographic algorithm, so that secure data encryption is enabled in the white-box environment, without requiring an additional operation process for protecting the encryption key.

In addition, according to the embodiments of the present disclosure, it is possible to implement a cryptographic algorithm that can satisfy various criteria for safety, memory usage amount, and the like, which are required in an application environment by applying a key table in which additional logic for extending a tweak value is not required and there is no selection condition for internal logic, and which provides various input/output sizes regardless of the overall input size of the cryptographic algorithm.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of generating a cryptographic algorithm, the method comprising:
    generating one or more key tables on the basis of a seed value;
    generating, by using a round tweak bit string and a first input bit string that is input to one of input branches of a Feistel structure, a first transformation function that converts the first input bit string into a first random bit string having a length that extends beyond a length of the first input bit string, the length of the first input bit string being varied according to a length of a unit input required in an environment to which the cryptographic algorithm is applied;
    generating a second transformation function that converts a second random bit string generated by referencing the one or more key tables into a third random bit string having a length that is the same as the length of the first input bit string; and
    generating a block cryptographic algorithm of a Feistel structure which includes a round function to which the one or more key tables, the first transformation function, and the second transformation function are applied,
    wherein the round function is configured to: convert the first input bit string input to one of the input branches into the first random bit string using the first transformation function, convert the first random bit string into the second random bit string by referencing the one or more key tables according to a predetermined number of times of referencing a key table, and convert the second random bit string into the third random bit string using the second transformation function, and
    wherein the third random bit string is used to perform an exclusive OR operation with a second input bit string that is input to another of the input branches of the Feistel structure.

2. The method of claim 1, wherein a length of an input bit string and a length of an output bit string for the one or more key tables are dynamically determined on the basis of a size of an available memory.

3. The method of claim 1, wherein the length of the first random bit string is determined on the basis of a predetermined number of times of referencing a key table and a length of an input bit string for the one or more key tables.

4. The method of claim 1, wherein the round function is further configured to:
    divide the first random bit string into d (where d is the number of times of referencing a key table) bit strings each having a length of L bits (where L is a length of an input bit string for the one or more key tables) on the basis of the number of times of referencing a key table,
    convert the d bit strings, each having a length of L bits, into d bit strings, each having m bits (where m is a length of an output bit string for the one or more key tables), by referencing the one or more key tables as many times as the number of times of referencing a key table, and
    generate the second random bit string by concatenating the d bit strings, each having a length of m bits.

5. An apparatus for generating a cryptographic algorithm, comprising:
    one or more processors;
    a memory; and
    one or more programs,
    wherein the one or more programs are stored in the memory and are configured to be executed by the one or more processors and
    the one or more programs include commands for
    generating one or more key tables on the basis of a seed value,
    generating, by using a round tweak bit string and a first input bit string that is input to one of input branches of a Feistel structure, a first transformation function that converts the first input bit string into a first random bit string having a length that extends beyond a length of the first input bit string, the length of the first input bit string being varied according to a length of a unit input required in an environment to which the cryptographic algorithm is applied,
    generating a second transformation function that converts a second random bit string generated by referencing the one or more key tables into a third random bit string having a length that is the same as the length of the first input bit string, and
    generating a block cryptographic algorithm of a Feistel structure which includes a round function to which the one or more key tables, the first transformation function, and the second transformation function are applied, wherein the round function is configured to: convert the first input bit string input to one of the input branches into the first random bit string using the first transformation function, convert the first random bit string into the second random bit string by referencing the one or more key tables according to a predetermined number of times of referencing a key table, and convert the second random bit string into the third random bit string using the second transformation function, and wherein the third random bit string is used to perform an exclusive OR operation with a second input bit string that is input to another of the input branches of the Feistel structure.

6. The apparatus of claim 5, wherein a length of an input bit string and a length of an output bit string for the one or more key tables are dynamically determined on the basis of a size of an available memory.

7. The apparatus of claim 5, wherein the length of the first random bit string is determined on the basis of a predetermined number of times of referencing a key table and a length of an input bit string for the one or more key tables.

8. The apparatus of claim 5, wherein the round function is further configured to:

divide the first random bit string into d (where d is the number of times of referencing a key table) bit strings each having a length of L bits (where L is a length of an input bit string for the one or more key tables) on the basis of the number of times of referencing a key table, convert the d bit strings, each having a length of L bits, into d bit strings, each having m bits (where m is a length of an output bit string for the one or more key tables), by referencing the one or more key tables as many times as the number of times of referencing a key table, and generate the second random bit string by concatenating the d bit strings, each having a length of m bits.

9. A method of encryption, comprising:

generating a round tweak bit string;

converting, by using a first transformation function, the round tweak bit string and a first input bit string, which is input to one of input branches of a Feistel structure which includes a round function to which one or more key tables, the first transformation function, and a second transformation function are applied, into a first random bit string having a length that extends beyond a length of the first input bit string;

converting the first random bit string into a second random bit string by referencing the one or more key tables;

converting, by using the second transformation function, the second random bit string into a third random bit string having the same length as the length of the first input bit string; and performing an exclusive OR operation between the third random bit string and a second input bit string that is input to another input branch among the input branches of the Feistel structure, wherein the length of the first input bit string is varied according to a length of a unit input required in an environment to which the cryptographic algorithm is applied.

10. The method of claim 9, wherein the length of the first random bit string is determined on the basis of a predetermined number of times of referencing a key table and a length of an input bit string for the one or more key tables.

11. The method of claim 9, wherein the converting into the second random bit string comprises converting the first random bit string into the second random bit string by referencing the one or more key tables according to a predetermined number of times of referencing a key table.

12. The method of claim 11, wherein the converting into the second random bit string comprises:

dividing the first random bit string into d (where d is the number of times of referencing a key table) bit strings each having a length of L bits (where L is a length of an input bit string for the one or more key tables) on the basis of the number of times of referencing a key table, converting the d bit strings, each having a length of L bits, into d bit strings, each having m bits (where m is a length of an output bit string for the one or more key tables), by referencing the one or more key tables as many times as the number of times of referencing a key table; and generating the second random bit string by concatenating the d bit strings, each having a length of m bits.

13. An apparatus for encryption, comprising:

one or more processors;

a memory; and one or more programs, wherein the one or more programs are stored in the memory and are configured to be executed by the one or more processors and the one or more programs include commands for generating a round tweak bit string, converting, by using a first transformation function, the round tweak bit string and a first input bit string, which is input to one of input branches of a Feistel structure which includes a round function to which one or more key tables, the first transformation function, and a second transformation function are applied, into a first random bit string having a length that extends beyond a length of the first input bit string, converting the first random bit string into a second random bit string by referencing the one or more key tables, converting, by using the second transformation function, the second random bit string into a third random bit string having the same length as the length of the first input bit string, and performing an exclusive OR operation between the third random bit string and a second input bit string that is input to another input branch among the input branches of the Feistel structure, wherein the length of the first input bit string is varied according to a length of a unit input required in an environment to which the cryptographic algorithm is applied.

14. The apparatus of claim 13, wherein the length of the first random bit string is determined on the basis of a predetermined number of times of referencing a key table and a length of an input bit string for the one or more key tables.

15. The apparatus of claim 13, wherein the converting into the second random bit string comprises converting the first random bit string into the second random bit string by referencing the one or more key tables according to a predetermined number of times of referencing a key table.

16. The apparatus of claim 15, wherein the converting into the second random bit string comprises:

dividing the first random bit string into d (where d is the number of times of referencing a key table) bit strings each having a length of L bits (where L is a length of an input bit string for the one or more key tables) on the basis of the number of times of referencing a key table;

converting the d bit strings, each having a length of L bits, into d bit strings, each having m bits (where m is a length of an output bit string for the one or more key tables), by referencing the one or more key tables as many times as the number of times of referencing a key table; and generating the second random bit string by concatenating the d bit strings, each having a length of m bits.

* * * * *